Figure 4:
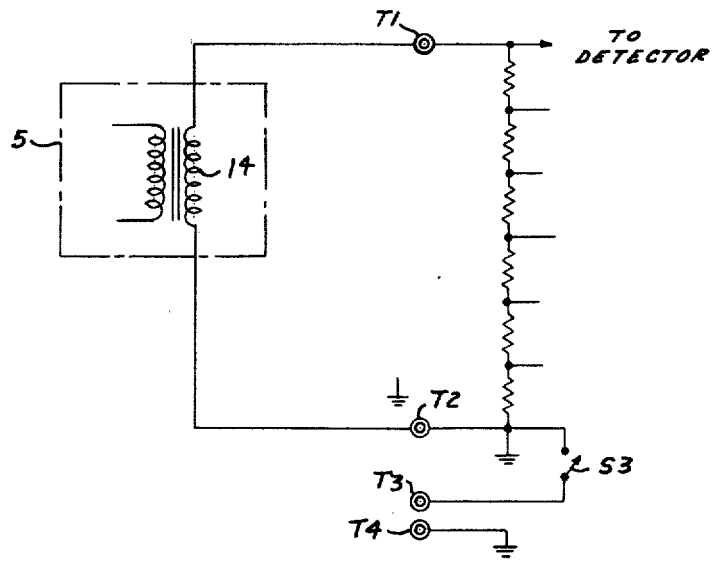

Jan. 14, 1958     G. T. CLAWSON     2,820,193
ELECTROMAGNETIC ELECTROSTATIC SHIELDING ANALYZER
Filed Oct. 14, 1955     3 Sheets-Sheet 1
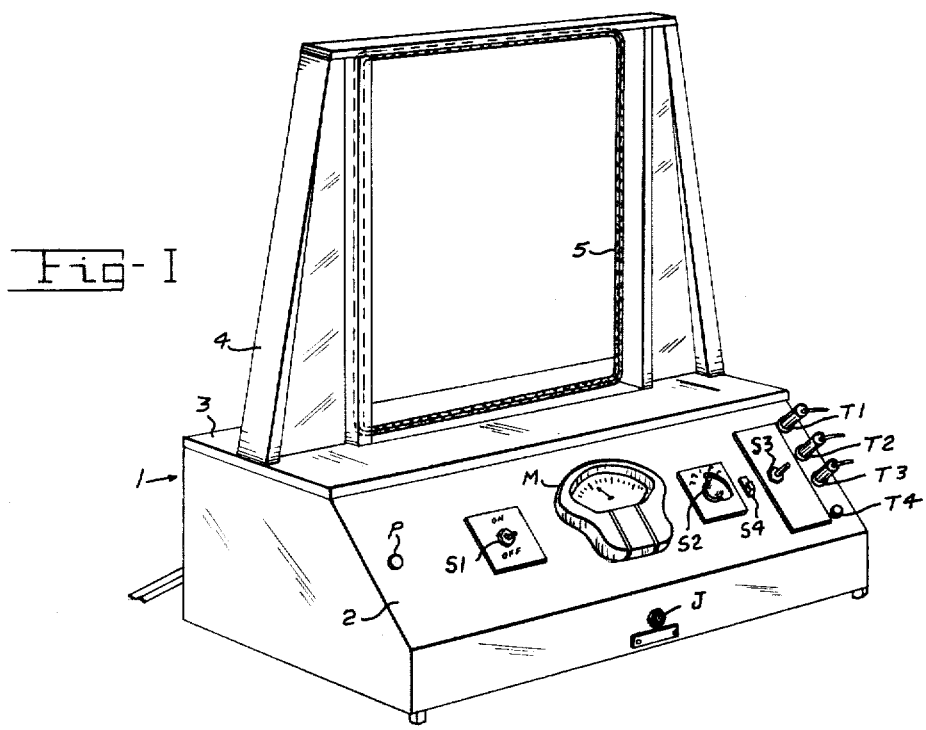
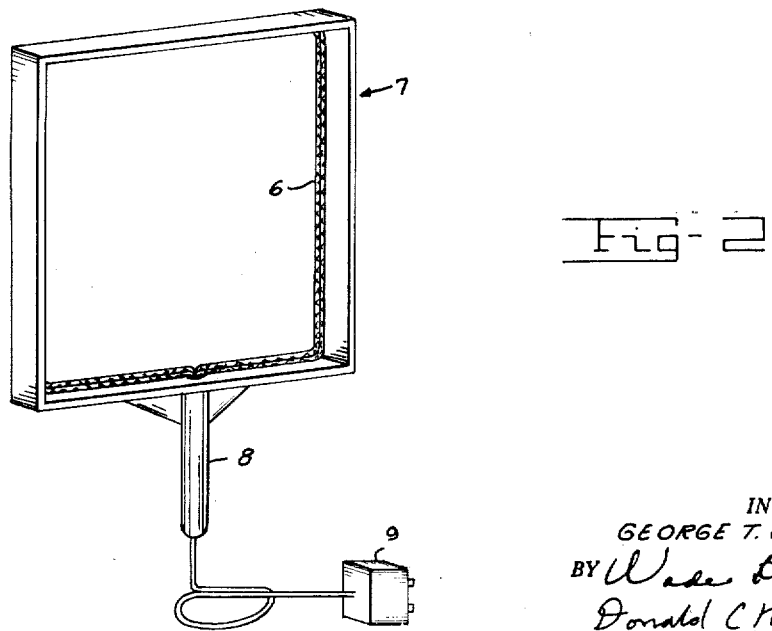
INVENTOR.
GEORGE T. CLAWSON
BY
ATTORNEYS

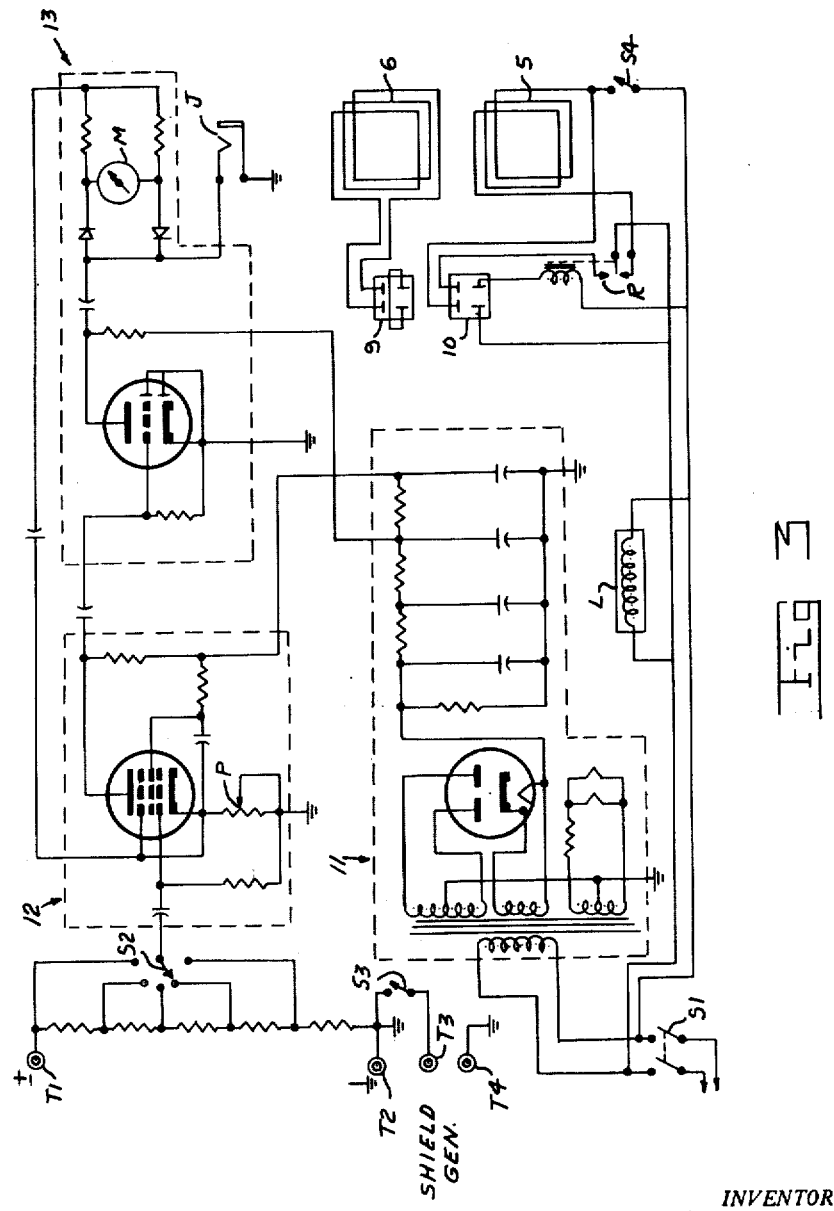

INVENTOR.
GEORGE T. CLAWSON
BY
ATTORNEYS

United States Patent Office 2,820,193
Patented Jan. 14, 1958

2,820,193
ELECTROMAGNETIC ELECTROSTATIC SHIELDING ANALYZER

George Thomas Clawson, Westernville, N. Y., assignor to the United States of America as represented by the Secretary of the Air Force Application October 14, 1955, Serial No. 540,657

5 Claims. (Cl. 324—51)

(Granted under Title 35, U. S. Code (1952), sec. 266)

The invention described herein may be manufactured and used by or for the United States Government for governmental purposes without payment to me of any royalty thereon.

This invention relates to a composite test equipment which can be permanently set up for electromagnetic and electrostatic shielding tests to be performed on transformers, chokes, inductors, and other equipment of a similar nature.

It is an object of the present invention to provide a compact, space-saving, multipurpose test unit in permanently assembled form which affords fast and accurate testing of electromagnetic and electrostatic shielding.

It is a further object of the invention to provide such a test unit which is simple and foolproof in design and operation.

These and other objects and advantages are achieved by mounting a magnetic field generating coil upon a housing which contains a detector unit and its associated preamplifier and power supply. The sample to be tested is inserted within the field of the coil and has its leads connected to input terminals of the detector, which terminals may be selected to read either electromagnetic or electrostatic voltages resulting in the sample. These voltages are in turn a measure of the quality of the shielding of the sample. A traveling or hand-held field coil may be plugged into the circuit for use with samples which are not easily manipulated within the field of the fixed coil.

Figure 5:
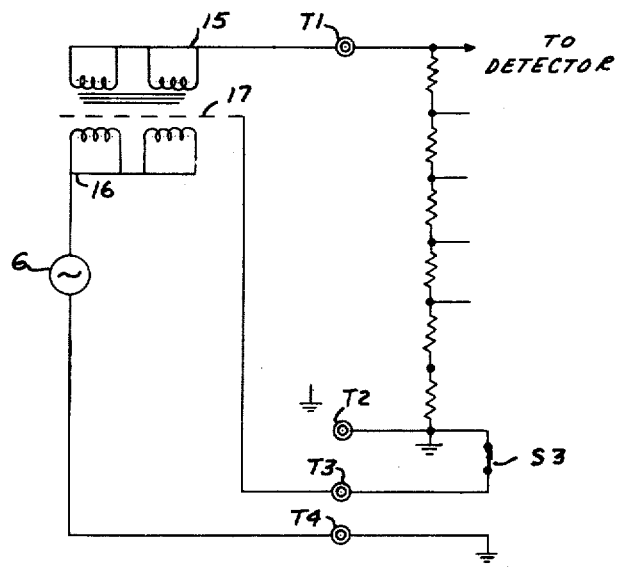

The invention will be more fully understood from the following description and drawings wherein like reference characters refer to like parts throughout and wherein:

Figure 1 is an oblique view of the test unit.
Figure 2 is an oblique view of the traveling field coil.
Figure 3 is a circuit diagram of the components mounted on a chassis within the housing of the test unit.
Figure 4 is a circuit diagram of the terminal connections for testing electromagnetic shielding of a sample.
Figure 5 is a circuit diagram of the terminal connections for testing electrostatic shielding of a sample.

Turning now to Figure 1, there is shown a housing 1 which includes a front panel 2 and a top panel 3 upon which is mounted a superstructure 4. Housing 1 is preferably of metallic construction and superstructure 4 is preferably of translucent plastic construction. A permanently fixed coil 5 is wound within the superstructure 4 and serves as a magnetic field generating unit when connected as shown in Figure 3 to be described in detail below. The components mounted on front panel 2 will also be described in connection with Figure 3.

Figure 2 shows a portable coil 6 wound within a framework 7 having a handle 8. Coil 6 terminates in a first or male part 9 of a four contact two part separable connector having the contacts so arranged as to prevent improper coupling and known in the art as a Jones plug which may be connected to the second or female part 10 of the four contact Jones plug which is wired as shown in Figure 3 and physically mounted at the rear of housing 1.

Turning now to Figure 3 it will be seen that a 115 v. 60 cycle power source may be connected through switch S1 to the input of a conventional power supply shown within the dashed block 11 and in parallel to the field generating coil circuits. These latter circuits include the first or male Jones plug part 9 and second or female Jones plug part 10 both wired as shown and connected respectively to the portable field coil 6 and the stationary field coil 5. Relay R is normally biassed to be closed on its lower contact so that when switch S4 is closed and male Jones plug part 9 is not connected with female part 10 coil 5 is activated. When plug part 9 is connected to plug part 10 it will be seen that relay R is activated which moves its contact arm to its upper contact thus cutting coil 5 out of the circuit and applying power to coil 6. Switch 4 will, of course, cut off the power to either coil 5 or 6 without affecting power supply 11.

A lighting fixture L of any suitable type is mounted in a slot in the top 3 of housing 1 beneath superstructure 4 in such a fashion as to base light the translucent plastic superstructure. Lighting fixture L is connected across the 115 v. 60 cycle power source as shown in Figure 3.

Power supply 11 is connected in the conventional manner shown to supply plate power to the tubes of a preamplifier unit 12 and a vacuum tube voltmeter unit 13. Unit 13 is a standard vacuum tube voltmeter bridge circuit, the meter movement being connected across the bridge and physically mounted on front panel 2 of housing 1. A plurality of different sensitivity ranges may be selected by switch S2, which is a plural position switch, physically mounted on front panel 2 and has its arm connected to the input of preamplifier 12. The various switch contacts are connected to various points of a voltage divider connected between terminals T1 and T2 which are also mounted on front panel 2. Any signal applied across terminals T1 and T2 will thus be fed through preamplifier 12, the gain of which is controlled by biasing potentiometer P, to the vacuum tube voltmeter unit 13 by the conventional connections shown. A jack J is also provided so that the voltage appearing across meter M may also be fed to an external oscilloscope or other measuring instrument. Two additional terminals T3 and T4 are also mounted on front panel 2 and are used for a purpose to be described below. T3 is connected through switch S3 to terminal T2 which is in turn grounded. Terminal T4 is directly grounded. The mounting of all terminals, switches and controls on the front panel facilitates fast and easy operation of the test unit. The other components of power supply 11, preamplifier 12, and vacuum tube voltmeter 13 are mounted on a chassis within housing 1.

Figure 4 shows the connections for evaluation of electromagnetic shielding of a sample. The highest voltage or impedance winding 14 of a transformer or inductor sample to be tested is connected across the input terminals T1 and T2 of the analyzer. The sample is then held inside the rectangular superstructure frame 4 in the approximate center of the field created by coil 5. The sample is slowly rotated through all of its axes until maximum indication is noted on the meter M. This maximum indication, comparable to the weakest point of the shielding, can be resolved into a volts/turn figure arising from the magnetic coupling between the field test coil 5 and the test sample 14 and will show the shielding efficiency of the magnetic shielding material under test. Further analysis of the sample can be made by removing the shielding material from the sample and repositioning the unshielded sample in the magnetic test field. The percentage of shielding efficiency may then be expressed as the quantity one minus the ratio of shielded volts per turn to unshielded volts per turn all times one hundred.

If it is desired to test shielding material before assembly or use, a standard high impedance coil may be used in place of transformer 14 and the shielding material is then wound around the standard coil.

Figure 5 shows the connections for evaluation of electrostatic shielding of a sample. The transformer to be tested is wired so that all windings on one side of an electrostatic shield 17 are connected together as at 15 and thence to terminal T1. All windings on the other side of the electrostatic shield are connected together, as at 16 and thence to one side of a signal generator G, the other side of which is connected to ground through terminal T4. Electrostatic shield 17 is then connected to switch S3 through terminal T3.

The generator voltage is first raised to a value that will give a nominal reading on the detector meter scale with switch S3 open. After the voltage reading is recorded switch S3 is closed thus connecting shield 17 to the common ground and the generator voltage is again raised until the value of the preceding reading is reached on the detector scale. The ratio between the two generator-recorded voltages required to give the same detector voltage reading, when computed in a manner similar to that used to obtain the percentage efficiency of electromagnetic shielding, will give the percent efficiency of electrostatic shielding.

Thus it is seen that I have provided a compact, space-saving multipurpose test unit in permanently assembled form which permits fast and accurate testing of electromagnetic and electrostatic shielding and is simple and foolproof in design and operation.

Having thus fully described my invention, what I claim is:

1. An electromagnetic and electrostatic shielding analyzer comprising, a housing, at least one magnetic field generating coil, said coil being wound within a superstructure mounted on top of said housing, said coil and said superstructure being so shaped as to permit the insertion within the coil's magnetic field of a shielded sample to be tested; a preamplifier unit connected in cascade with a vacuum tube voltmeter unit, a power supply for said units, said power supply and said units being connected in operative relationship with each other and being mounted on a chassis within said housing, the meter movement of said vacuum tube voltmeter being mounted on a front panel of said housing; means controlled by a first switch to apply an alternating voltage in parallel to said power supply and said field generating coil; first and second input terminals to said preamplifier, a voltage divider connected between said terminals, said second terminal being grounded and said first terminal being connected through said voltage divider and a second plural position range switch to the grid of said preamplifier; a third input terminal connected to said second input terminal through a third two position switch, and a fourth input terminal connected to ground; all of said input terminals and said switches being mounted on said front panel of said housing; said first and second terminals being used to connect said sample to be tested to said preamplifier for electromagnetic testing, and said first and third terminals being used to connect said sample to be tested to said preamplifier for electrostatic testing.

2. Apparatus as in claim 1 including a portable field generating coil, a separable connector to connect said portable field generating coil to said analyzer and a relay controlled by said separable connector to select the coil to be energized.

3. Apparatus as in claim 1 wherein said superstructure consists of a translucent material and wherein a lighting fixture is connected in parallel with the input to said power supply and is mounted in said housing so as to base light said superstructure.

4. Apparatus as in claim 1 wherein a jack is provided and is so connected that the voltage impressed across the meter movement of said vacuum tube voltmeter may be connected through said jack to the input of an external oscilloscope.

5. A shielding analyzer comprising a housing, a first magnetic field generating coil mounted on said housing, a second magnetic field generating coil portable with respect to said housing, said coils being so shaped as to permit the insertion within the magnetic fields thereof of a shielded sample to be tested, a preamplifier unit connected in cascade with a vacuum tube voltmeter unit, a control grid for said preamplifier, a power supply for said units, said power supply and said units being connected in operative relation with each other and being mounted within saaid housing, the meter movement of said vacuum tube voltmeter being mounted on said housing, first and second input terminals to said preamplifier, a voltage divider connected between said first and second input terminals, said second terminal being grounded and said first terminal being connected through said voltage divider and a plural position range switch to said grid of said preamplifier, a third input terminal, switch means operable to connect said third input terminal to said second input terminal, a fourth input terminal connected to ground, all of said input terminals and said switches being mounted on said housing; said first and second input terminals being used to connect the sample to be tested to said preamplifier for electromagnetic analysis, said first and third input terminals being used to connect the sample to be tested to said preamplifier for electrostatic analysis, a source of alternating voltage, circuit means including a supply switch for connecting said source to said power supply, means for selectively energizing said first and second magnetic field generating coils including a two position relay, said relay including first and second contacts, a movable contact and an operating coil, said movable contact being connected to one side of said circuit means, a first terminal of said first magnetic field generating coil being connected to said first contact, a second terminal of said first coil being connected to the other side of said circuit means, a two part separable plug having a first and second pair of connectors, said connectors being arranged to prevent improper coupling of said connectors, said second coil being connected to the first pair of connectors of the first part of said plug, the second pair of connectors of said first part being connected together, said second contact being connected to one of the first pair of connectors of the second part of said plug, the other connector of said first pair of connectors being connected to the second terminal of said first magnetic field generating coil, said operating coil being connected between one side of said circuit means and one of the second pair of connectors of said second part and the other connector of said second pair of connectors of said second part being connected to the other side of said circuit means.

References Cited in the file of this patent
UNITED STATES PATENTS

| | | |
|---|---|---|
| 2,504,395 | Cross | Apr. 18, 1950 |
| 2,677,100 | Hayhurst | Apr. 27, 1954 |